Nov. 1, 1966 D. M. JAHN 3,283,130

DIGITAL COMPUTER HAVING TIME SHARED ARITHMETIC UNITS RESPECTIVELY FOR FAST AND SLOW COMPUTATIONS

Filed Nov. 21, 1961 5 Sheets-Sheet 1

INVENTOR.

DALE M. JAHN

BY

[signature]

ATTORNEY

INVENTOR.
DALE M. JAHN
BY
[signature]
ATTORNEY

Nov. 1, 1966 D. M. JAHN 3,283,130

DIGITAL COMPUTER HAVING TIME SHARED ARITHMETIC UNITS RESPECTIVELY FOR FAST AND SLOW COMPUTATIONS

Filed Nov. 21, 1961 5 Sheets-Sheet 3

INVENTOR.
DALE M. JAHN
BY
[signature]
ATTORNEY

INVENTOR.
DALE M. JAHN
BY
[signature]
ATTORNEY

Nov. 1, 1966 D. M. JAHN 3,283,130

DIGITAL COMPUTER HAVING TIME SHARED ARITHMETIC UNITS RESPECTIVELY FOR FAST AND SLOW COMPUTATIONS

Filed Nov. 21, 1961 5 Sheets-Sheet 5

INVENTOR.
DALE M. JAHN
BY
ATTORNEY

United States Patent Office 3,283,130

Patented Nov. 1, 1966

3,283,130

DIGITAL COMPUTER HAVING TIME SHARED ARITHMETIC UNITS RESPECTIVELY FOR FAST AND SLOW COMPUTATIONS

Dale M. Jahn, Garden City, N.Y., assignor to Sperry Rand Corporation, Great Neck, N.Y., a corporation of Delaware Filed Nov. 21, 1961, Ser. No. 153,823

10 Claims. (Cl. 235—164)

This invention relates in general to digital computers and in particular provides a digital computer having a minimal latency program and two arithmetic units (each one of which is time shared among several similar problems), the first arithmetic unit performing short duration computations and the second arithmetic unit performing long duration computations. Computing apparatus embodying the invention requires:

(a) That its data storage device cyclically present data for a given problem at a rate that is slower than the computation rate of the slow arithmetic unit, the data for the different problems being presented in any random manner.

(b) That the output data from the fast arithmetic unit be time-delayed by an amount equal to the difference between the times that the two arithmetic units take to perform their respective computations.

(c) That access to program instructions involve a minimum interval, i.e. a fast access memory.

(d) That its program instructions be so disposed that the time interval between consecutive long duration computations is greater than the computation time of the slow arithmetic unit.

With such requirements met, different computations for different problems may be performed continually, the respective result data for each problem occuring in the same time sequence as the data from which such results were derived, thereby (as will be seen later) facilitating data decoding and writing, and programming.

By the above reference to "similar problems" is meant that the same function is continually computed, however for different assigned values that go to make up the function. For example, the instant apparatus might be used in an aircraft control environment to compute range, elevation and azimuth for a plurality of spatially dispersed aircraft. Here, data for each craft would be computed the same way (same program for each problem computation), but with values for the variables being different for each craft.

A principal object of the invention is to provide an improved form of digital computer.

Another object of the invention is to provide a digital computer capable of performing a series of computations in a particular time sequence, the results of those computations occurring in that same time sequence.

Another object of the invention is to provide a time shared digital computer wherein computations for different problems are performed in a particular time sequence, the results of those computations occurring in that same time sequence even though there are variations in individual computation times.

Another object is to provide a wired program computer that achieves maximum utilization of the arithmetic units through time sharing of the arithmetic units between problems and overcomes delays in the availability of problem information (storage system access time) by performing arithmetic operations on problems whose information is immediately available (minimum latency).

The invention will be described with reference to the figures wherein.

Figure 1:
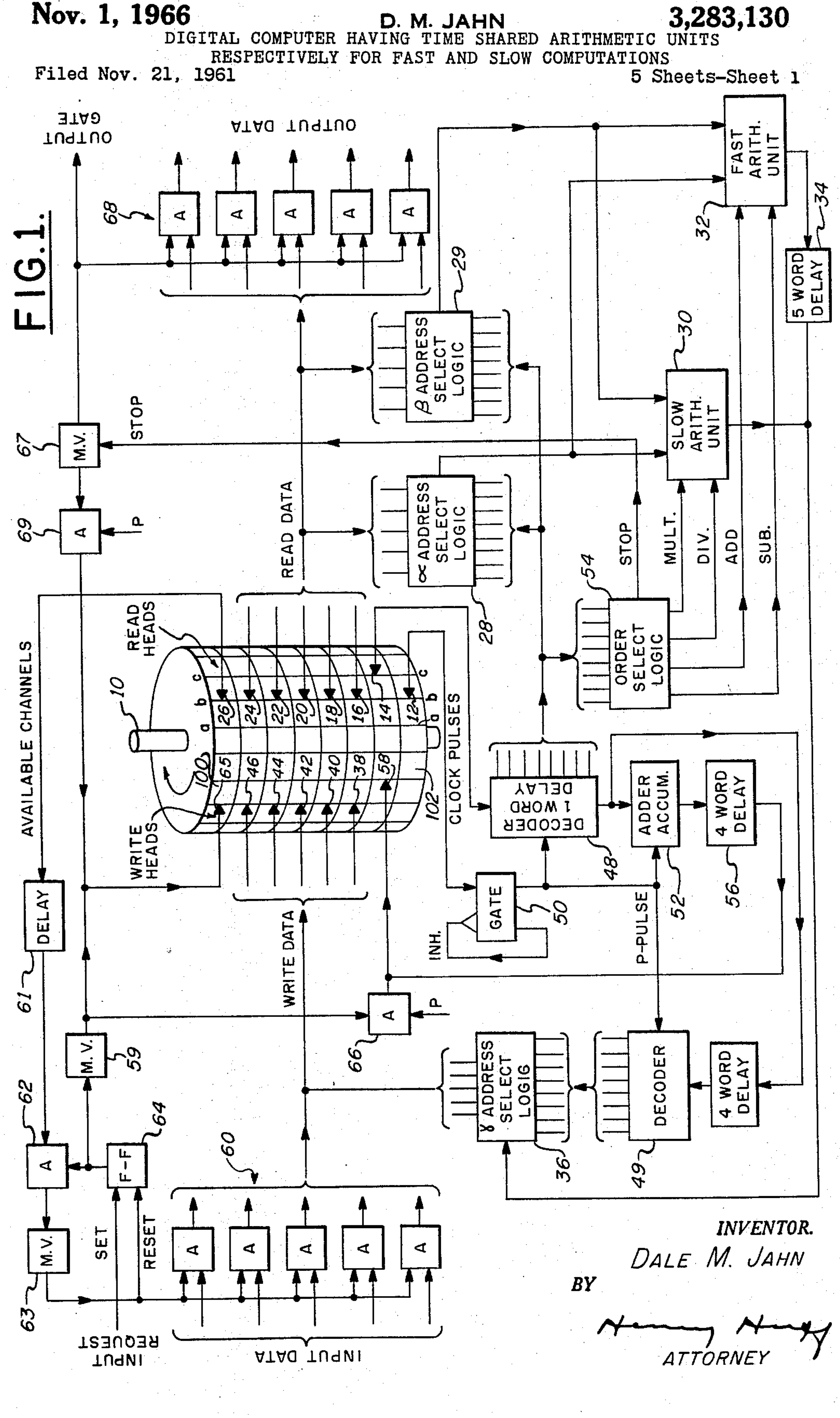
FIG. 1 is a block diagram of one form of the invention.

Referring to FIG. 1, a magnetic drum memory 10, having (for simplicity) only eight data tracks, has read heads respectively associated with the tracks; the read heads are numbered 12, 14, 16, 18, 20, 22, 24 and 26. Each box indicated on the face of the drum 10 is adapted to contain one digital data word; the read head 14 is adapted to read data words which occur (when the drum 10 rotates in the direction indicated by the arrow) one word time before the data words read by the other read heads. The data words read by the read heads 16, 18, 20, 22 and 24 are applied to logic circuits 28 and 29 which, according to program instruction data read by the read head 14, selects two of those data words and applies them to either a slow or fast arithmetic unit, respectively designated 30 and 32. Computations which can be performed almost instantly, e.g. adding and subtracting, are performed by the fast arithmetic unit 32; computations which require substantial time to complete, e.g. multiplication and division, are performed by the slow arithmetic unit 30, such unit being adapted to receive and process new data words only after prior computations are completed. For descriptive purposes, the time selected to complete multiplications and divisions is 5 word times.

The digital output data from the fast arithmetic unit 32 is applied to a delay device 34 and thence to a logic circuit 36, the logic circuit 36 also receiving the digital output data from the slow arithmetic unit 30. Depending on the program instruction data read by the read head 14, the logic circuit 36 applies its output data to one of a group of write heads 38, 40, 42, 44 and 46, each of which is disposed to write the answer to a computation begun five word times earlier.

As can be appreciated, the digital program instruction data read by the read head 14 determines what data is to be used in a computation, what computations are to be made with that data, and where the answer data that passes through the logic circuit 36 is to be written; it can be seen also that all data relating to a particular problem will be stored always at the same general address, i.e the data for one problem will be stored always between the lines *a—a* and *b—b* on the drum, the data for a different problem will be stored always between the lines *b—b* and *c—c* on the drum etc., thereby allowing the arithmetic units 30 and 32 to be time shared by several different problems.

To synchronize all operations, clock signals are provided by the read head 12. One clock pulse corresponds to one bit of the data stored on the storage drum 10 and processed through the computing elements of the computer. A group of these clock pulses corresponds to a word of data. Generally, there is need for a train of pulses which occur at word time intervals and which (by making each pulse occur simultaneously with the first digit of a word) may be used to initiate various switching functions. Accordingly, the gate circuit 50, receiving clock pulses read by the read head 12, is adapted to have its own output close the gate for a time interval equal to one less clock pulse than occurs during the period of a word time. For example, if there are fifteen clock pulses or bits in a word time, the gate 50 will be closed for the duration of 14 clock pulses, thereby permitting only the first of every 15 pulses to pass therethrough.

Before writing data for a new problem on the drum face, assurance must be had that there is a general address available for that data; otherwise, there is a chance of writing over the data already stored and being processed by the computer. The drum 10, therefore, is provided with an address check track which stores a pulse at the beginning of the word for each general address or channel that is available for new data. The available channel pulses, read by read head 26, are passed through a delay device 61 to a gate 62 which will pass only one pulse providing an input request signal was received and registered in flip-flop 64. The gated pulse triggers the one word multivibrator 63 which resets flip-flop 64 to its idle state closing gate 62. Thus only one available channel pulse is selected and a word gate is formed by multivibrator 63 to gate the new input data through gates 60 to the write heads 38, 40, 42, 44 and 46 of drum 10. The existence of a gate pulse from multivibrator 63 through the reset of flip-flop 64 causes multivibrator 59 to generate a signal which will erase the control pulse indicating that the selected channel had been available. The erase pulse from multivibrator 59 also gates a word pulse, P, through gate 66 and write head 58 into the program instruction data channel to initiate the computation cycle at the first step in the program.

The computations are removed from the computer through the use of a program Stop. This is one of the orders that the order select logic can select. When the Stop order is called for, multivibrator 67 is caused to form a gate pulse which switches the output data to using devices through gates 68 and, in addition, gates a new available channel pulse into the address check track through gate 69 and write head 65.

The program instruction data read from read head 14 consists of a sequence of numbers. The particular sequence for a given problem would be typically represented by a numerical count which corresponds to the number of the step in the program to be executed in the following word period.

Corresponding to each number in the program instruction data there is an instruction to the computer which typically consists of four parts, $\alpha$, the address or read head from which one input to the two arithmetic units is selected, $\beta$, the address or read head from which the second input to the two arithmetic units is selected, $\gamma$, the address or write head to which the computed results are directed. The fourth part of the instruction directs one of the two arithmetic units to perform a particular operation on the numerical data presented to them. This part of the instruction is referred to as an order.

The numbers read by read head 14 are applied to decoder 48 to convert the numerical representation of the program instruction data to a signal capable of directing the logic networks 28, 29 and 36 to switch the processed data to the proper place.

The output control signal from the decoder also directs logic network 54 to instruct one of the arithmetic units to perform a particular operation on a given program step. The output control signal from the decoder is provided, typically, on one of a set of wires, each wire corresponding to each step in the desired program or programs. A particular step in the program is executed when a given wire is activated.

In order to sequence through the program instructions, the numbers processed through read head 14 and decoder 48 must be incremented periodically. To achieve this result, binary accumulator 52 (an adding circuit) receives the number representing the program instruction and the word pulses from gate 50. The output of the accumulator 52 is a new number corresponding to the next intended step in the program. The new number is passed through a delay device 56 and to the program instruction data write head 58. The delay device is so adapted that the total delay between reading and writing the program instruction data for a particular general problem address is exactly five words times.

In operation, the data words of the different problems to be solved are brought sequentially under the read heads 16, 18, 20, 22 and 24 when the drum 10 rotates; as shown, problem data words stored between lines *b—b* and *c—c* on the drum 10 are about to pass under the read heads, these data words being all applied simultaneously to the logic circuit 28 and 29. The program read head 14, through decoder 48, then applies (one word time later) the program instruction data to the logic circuits 28 and 29 thereby causing the logic circuits to select two of their received data words and apply them to one of the two arithmetic units. With the logic circuits 28 and 29 applying this output data to the slow arithmetic unit 30 (which takes five word times to complete a computation), answer data is written in a selected place (such place being selected by the logic circuit 36) on the drum 10 at the instant it is produced. With the logic circuits 28 and 29 applying their output data to the fast arithmetic unit 32 (which can provide an answer almost instantly), the delay device 34 holds up writing the answer to this computation for five word times. Thus, the "read" data and "write" data are forced into the same time sequence; because each drum write head is displaced five word times away from its respective read head; i.e. displaced timewise by the computation time of the slow arithmetic unit 20, it always writes answer data at its proper general address on the drum 10.

As stated earlier, the apparatus embodying the invention exhibits the character of minimum latency programs, that is, a program that keeps the arithmetic unit of a computer busy doing useful work in spite of delays which may be inherent in the storage medium of the computer. The use of a drum memory generally means that stored data is available only once each rotation of the drum. This is the access time for the memory of the computer shown in FIG. 1. Because of the methods by which the computer is timeshared among the several problems, time that would be wasted in waiting for access to new information on a particular problem is profitably spent in executing instructions on other problems whose data is instantaneously available.

In the case that certain problem channels are not used, the arithmetic units are indeed idle for a period. However, this does not distract from the minimum latency concept because this represents the chosen method of letting the excess computer capacity of the computer be idle.

Whereas the read head 14 is not aligned spatially with the other read heads, it may of course be so aligned if the data stored on its associated track is retarded.

Figure 2:
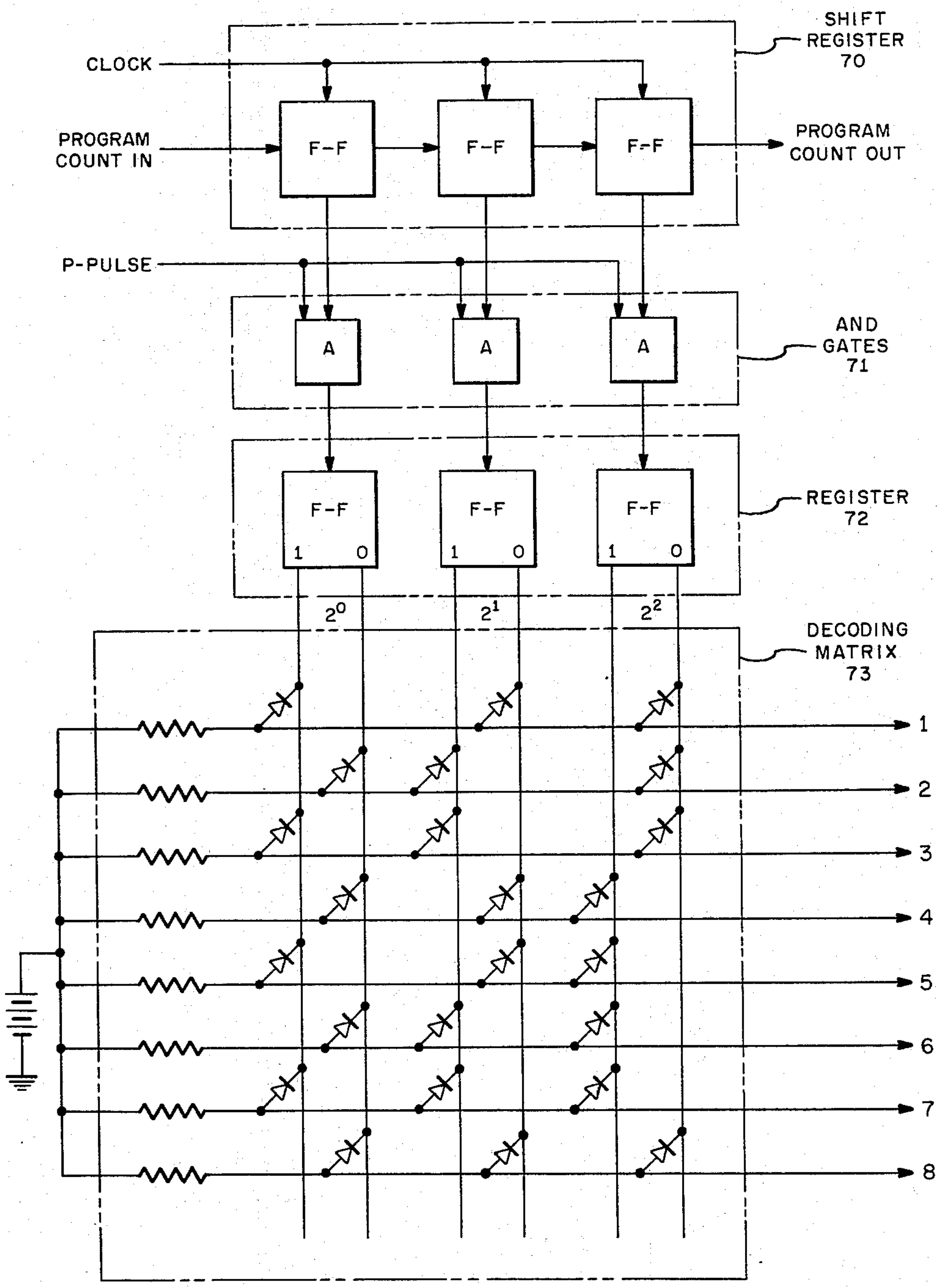
FIG. 2 is a block diagram of one form of decoder.

A typical mechanization of the decoders 48 and 49 used to transform the number representing program instructions to a specific activated output control wire is shown in FIG. 2. These decoders receive the binary number from the drum through read head 14. The received number enters shift register 70. When register 70 is full, i.e. a complete word occupied the register, a word control pulse P from gate 50 may gate the information from register 70 through gates 71 to the register 72 which holds the number for one word period, namely, the word period during which the gated number is used to determine the source of the data for the arithmetic units and the operations which should be performed. The number in register 72 is decoded through matrix 73 which typically may consist of a set of crossed wires at which diodes are appropriately placed at crossing points to decode the binary number. For simplicity, FIG. 2 shows the connections used when the number is a 3 bit binary number. Obviously, any number of bits may be used depending upon the number of unique program steps desired. A three bit number can represent eight different states. The diode decoding matrix 73 recognizes each of these states and energizes one and only one of its output program control wires for each state.

Figure 3:
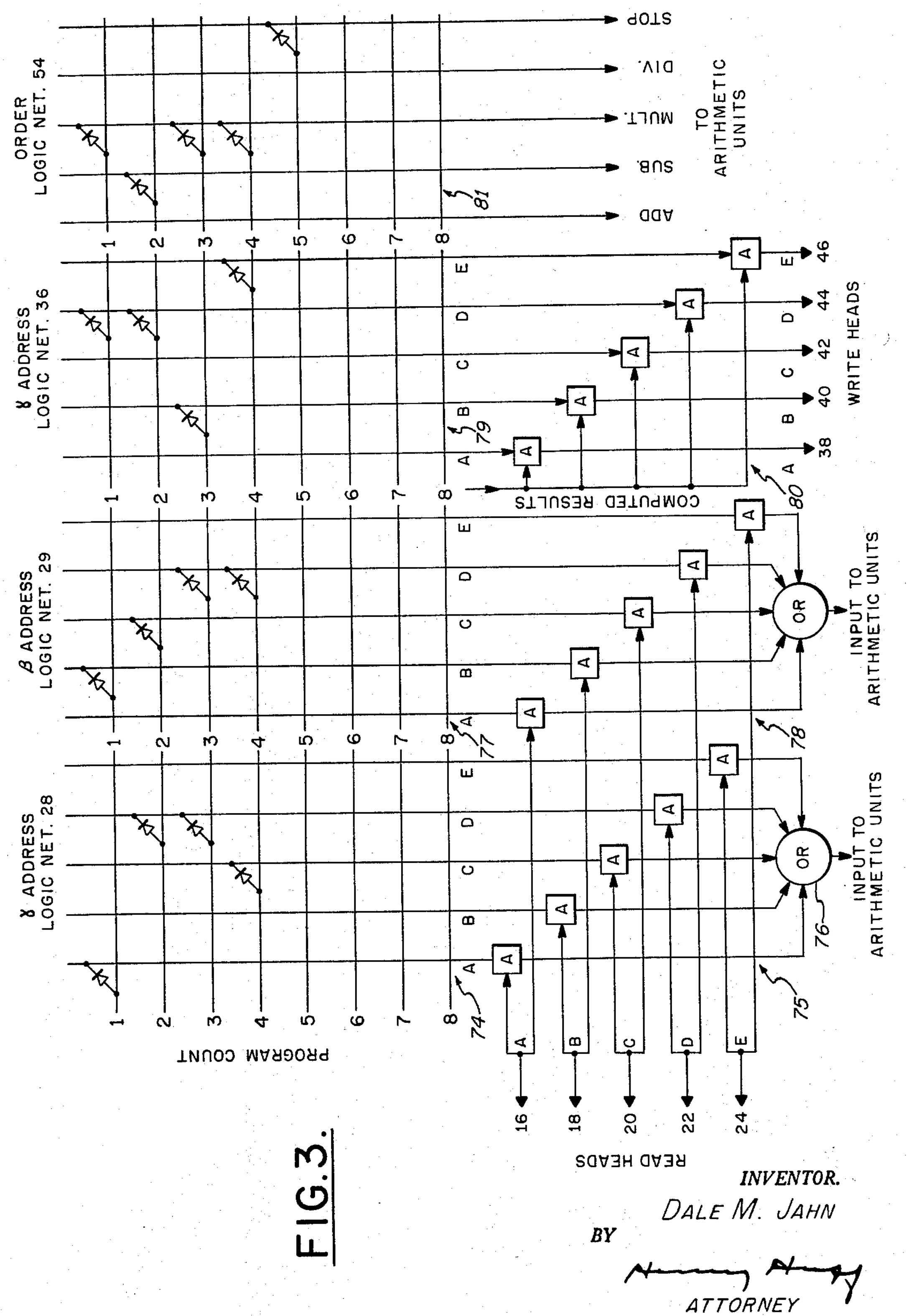
FIG. 3 is a logic diagram for typical logic networks.

The logic networks for selecting data, distributing data and directing the execution of orders are simple logical arrangements which can perform different actions depending upon which of the program control wires from the decoder is activated. FIG. 3 illustrates possible circuits for each of the selecting logical networks 28, 29, 36 and 54.

For simplicity only eight program control wires and five information channels (addresses) are illustrated. The explanation of logic networks 28 and 29 are identical. Information from the read heads 16, 18, 20, 22 and 24 feed AND gates 75 the outputs of which are combined in a logical OR network 76 for transmission to the inputs of the arithmetic units 30 and 32. The second input to the AND gates 75 consist of information derived from the program control wires, that is, several program control signals are ORed together to activate a specific read head AND gate. Whenever the program count corresponds to one of the ORed control wires, the specific AND gate is opened and information from the selected read head flows through to the arithmetic unit. The placement of the diodes in OR network 74 determine the sequence in which the AND gates 75 are operated. The logic network 36 differs slightly from 28 and 29. In this case, the data from the two arithmetic units feed all AND gates 80. The write head to which the data is directed is determined by the placement of diodes 79 between the program control wires and the second inputs to AND gates 80.

The logic network 54 simply states which program control wires activate which of the order control wires feeding its arithmetic units. That is, network 54 consists of a series of OR networks 81.

Programming of the computer consists of proper placement of diodes in OR networks 74, 77, 79 and 81, e.g. the OR networks are set to compute the expression $E=(AB-C)^3$. This particular apparatus for the mechanization of the program structure makes the computer a wired program computer. Other means for activating the data switches 75, 78 and 80 from the program instruction data are possible.

Figure 4:
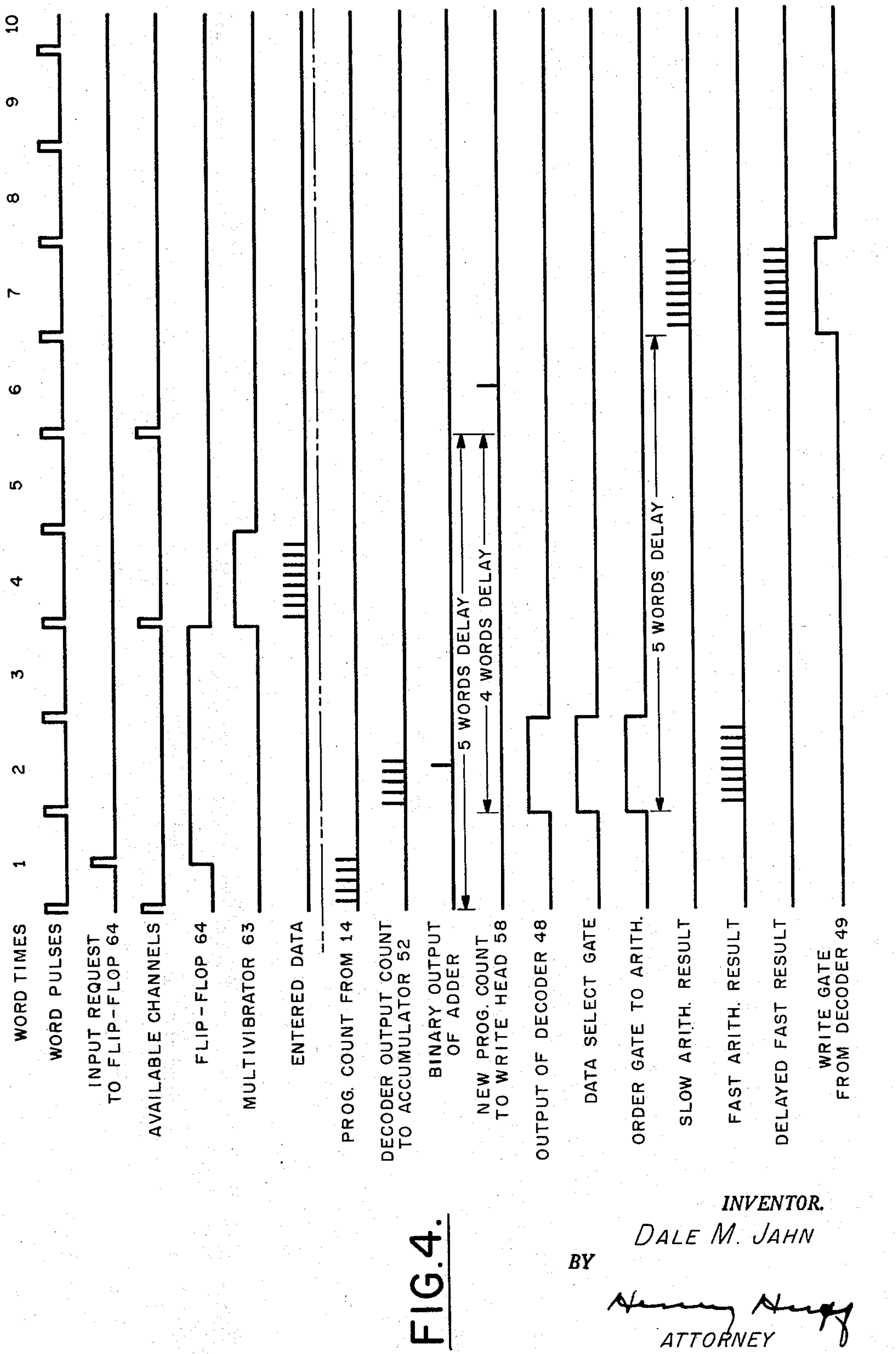
FIG. 4 is a timing diagram useful in describing the invention.

FIG. 4 pictorially demonstrates the operation of the apparatus of FIGS. 1, 2 and 3.

In entering data and starting a program, the input request arrives at some random time. Flip-flop 64 goes ON and remains ON until a delayed available channel pulse occurs. The first of these pulses turns on multivibrator 63 which turns off the flip-flop 64 and enters data into the drum memory.

A typical channel processing data through the arithmetic units is illustrated in word time 2 of FIG. 4. The numerical program instruction data for problem in word time 2 is read from head 14 during word time 1. At the beginning of word time 2, the decoder register 48, is full and the word pulse transfers the number to the decoder register for decoding and the formation of a program control gate on a specific program control wire issuing from the decoder. The program control gate feeds two data select gates and an order gate in logic networks 28, 29 and 54 respectively.

If the requested arithmetic order is a slow one (multiply or divide), the slow arithmetic unit processes the selected data and the answer is available during word time 7. If the requested arithmetic order is a fast one, (add or subtract), the fast arithemetic unit processes the selected data and the answer is available during the second word time. The delayed answer is placed in the seventh word time to make it identical to the period when the slow unit result would have been available. The output of the decoder 48 is delayed four words to make the total delay five words before it enters the decoder 49. This decoder then forms a write gate to place the result on a particular track of the drum.

To show how use of the above-described computing apparatus may be time shared among several problems, the following example is given: Assume that $$E=(AB-C)^3$$

is an equation to be computed for two adjacent targets, i.e. $E_1=(A_1B_1-C_1)^3$ for target 1 and $E_2=(A_2B_2-C_2)^3$ for target 2. Assume further that before data for targets 1 and 2 is received into the computer, the drum 10 data tracks, i.e. those read by read heads 16, 18, 20, 22 and 24, are all clear and that the data terms A, B and C, when written, are written respectively onto the tracks by write heads 38, 40 and 42.

Since targets 1 and 2 are adjacent, their respective data are written on the drum 10 at close general addresses, e.g. addresses 100 and 102. When $A_1$, $B_1$ and $C_1$, i.e. general address 100, appear under the read heads 16, 18 and 20, $A_1$ and $B_1$ are applied to the slow arithmetic unit 30 according to the program count 001. Immediately after (one word time), $A_2$, $B_2$ and $C_2$, i.e. address 102, appear under the read heads 16, 18 and 20, $A_2$ and $B_2$ here however being prevented from being processed by the slow arithmetic unit 30. Four word times later the product $A_1B_1$ emerges from the slow arithmetic unit 30, but by this time address 102, i.e. $A_2$ and $B_2$, is no longer under the read heads. $A_1B_1$ is written at general address 100 by the write head 44 in response to the delayed program count 001 processed by the address select logic 36. On the next revolution of the drum 10, i.e. when address 100 appears under the read heads, the read heads 22 and 20 read respectively $A_1B_1$ and $C_1$ and apply such data to the fast arithmetic unit 32, such unit instantly producing the difference $(A_1B_1-C_1)$ according to program count 010. A word time after address 100 is read, address 102 is read, the data $A_2$ and $B_2$ being applied to the slow arithmetic unit 30 to produce the product $A_2B_2$ in the manner described above. Five word times later (and one word time after $(A_1B_1-C_1)$ is written onto the drum 10) the product $A_2B_2$ is written onto the drum 10 by the write head 44. From this time on the two arithmetic units are time shared to compute data for the two targets. That is, on the next revolution of the drum 10 $(A_1B_1-C_1)$ is squared for target 1 (program count 011), and $C_2$ is subtracted from $A_2B_2$ for target 2 (program count 010).

Whereas the described apparatus performs either an instantaneous computation or a computation that takes five word times, it can be appreciated readily that the invention is not confined to only two different computing speeds. For example, high, medium and low speed arithmetic units can have their respective outputs delayed by large, medium and small amounts, thereby effecting the results desired by the invention.

Figure 5:
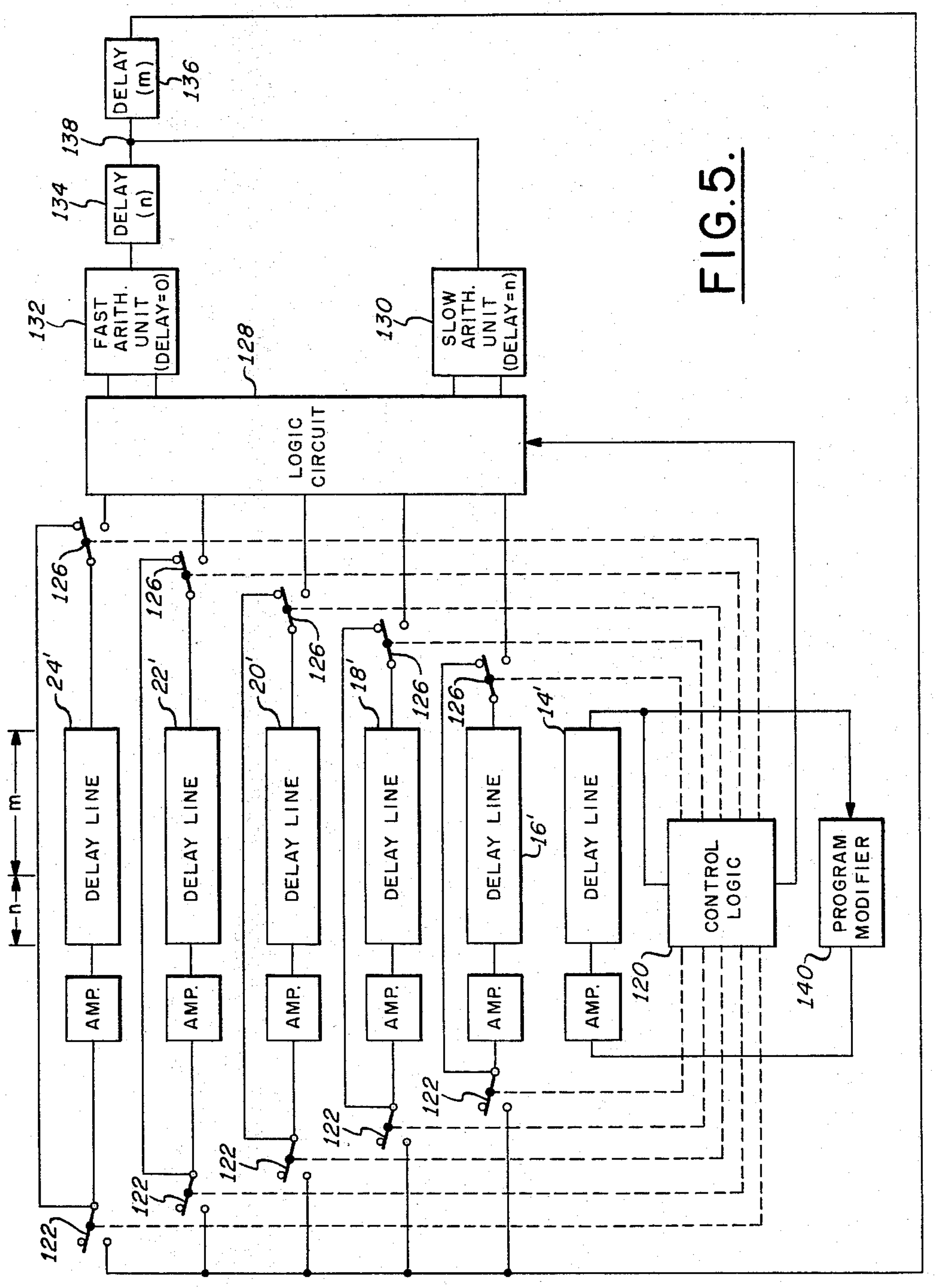
FIG. 5 is a block diagram of another embodiment of the invention.

Referring to FIG. 5, a form of the invention employing delay lines 16′, 18′, 20′, 22′ and 24′ for data storage tracks, has data read selectively into those tracks by means of a control logic circuit 120, i.e. the control logic circuit 120 selectively operates write switches 122 associated with the delay line data tracks whenever data is to be written. As shown, the delay lines are all $n+m$ word times long. When data pulses appear at the outputs of the delay line data tracks, the control logic circuit 120 operates different pairs of read switches 126 to apply that pulsed data to a logic circuit 128. The logic circuit 128 is controlled in accordance with a predetermined program by the logic circuit 120 and applies its received data pulses to either a slow or a fast arithmetic unit, respectively designated 130 and 132. With a computation time for the slow arithmetic unit 130 equal to $n$ word times, a delay device 134 (providing a delay of $n$ word times) is connected to receive the output data pulses of the fast arithmetic unit, thereby causing the fast and slow arithmetic units to have their respective output data pulses always in the proper time sequence as described above. A delay device 136, providing a delay equal to $m$ word times, receives the output data pulses appearing at the junction 138 and applies them to one of several write switches 122 as determined by the program controlled logic circuit 120.

The program data pulses, in addition to being applied to the logic circuits 120 and 128, are applied to a program modifier 140 which causes data pulses representing a new step in the program to be applied to the delay line 14'. This is so that the next time the data pulses for the particular problem in question appear at the output of the data delay lines, a new computational step can be performed.

As with the apparatus of FIG. 1, the program steps for the different problems must be so arranged that ordered slow arithmetic unit computations are at least *n* word times apart.

Except for the inclusion of the delay device 136, the form of the invention shown in FIG. 5 is, in essence, the same as the form of the invention shown in FIG. 1. The delay device 136 is included in the form of FIG. 5 merely to allow the data pulses for the different problems being solved to be written always at their proper places.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Digital computing apparatus comprising first and second arithmetic computing means, said first arithmetic computing means having an input section for receiving signals representing data quantities and perform therewith a first computation that is of a long duration, said second arithmetic computing means having an input section for receiving after said first computation is started by said first arithmetic computing means signals representing data quantities and perform therewith a second and different computation that is of short duration, means connected to receive the output signals from said second arithmetic computing means adapted to delay in time those signals by an amount equal to the difference between the times that said first and second arithmetic computing means take to complete their respective computations, memory means for storing the signals representing said data quantities and presenting those signals for computation at a cyclical rate that is less than the computation rate of the first arithmetic computing means, and means for selectively applying said data signals to one or the other of said arithmetic computing means according to a predetermined pattern that has ordered long duration computation spaced apart in time by at least the computation time of said first arithmetic computing means.

2. Digital computing apparatus comprising data storage means that cyclically provides signals representing data quantities for different problems, first and second computing means having respective input sections for receiving at dissimilar times the data signals and perform therewith computations, said first computing means performing only those computations which require substantial time to complete and said second computing means performing only those computations which require little time to complete, said first computing means being adapted to perform its computations at least as fast as said storage means cyclically provides the signals necessary for the solution of the different problems, delay means connected to receive the output signals from said second computing means delaying in time those signals by a time period equal to the computation time of the first computing means, and signal selecting means coupled to said storage means and adapted to apply in a predetermined manner particular data signals from the data storage means to either said first or second computing means, there being a time interval at least equal to the computation time of the first computing means between the application of signals to said first computing means.

3. Time shared digital computing apparatus comprising a data storage device that cyclically presents in sequence sets of signals representing the variables in different problems to be computed, first and second computing means coupled to said storage device and adapted to begin asynchronously to perform different computations with said signals, said first computing means performing only long duration computations and said second computing means performing only short duration computations, the computation rate of said first computing means being greater than the cyclical rate at which said data storage device cyclically presents the signals for any one of said problems, a time delay device connected to receive the output signals from said second computing means delaying its received signals by a time period equal to the difference between the times the two computing means take to perform their respective computations, and means for selecting in sequence different signal represented variables from each problem and applying according to a predetermined program those signals to one or the other of said computing means, said predetermined program being such that consecutive applications of signals to the first computing means are separated in time by at least the time it takes said first computing means to complete one of its computations.

4. Time shared digital computing apparatus comprising a data storage device that cyclically presents in sequence sets of signals representing the variables in different problems to be computed, first and second arithmetic computing means coupled to said storage device and adapted to begin asynchronously to perform different computations with said signals, said first arithmetic computing means performing only long duration computations and said second arithmetic computing means performing only short duration computations, the computation rate of said first arithmetic computing means being greater than the cyclical rate at which said data storage device cyclically presents the signals for any one of said problems, a time delay device connected to receive the output signals from said second arithmetic computing means delaying its received signals by a time period equal to the difference between the times the two arithmetic computing means take to perform their respective computations, and means for selecting in sequence different signals represented variables from each problem and applying according to a predetermined program those signals to one or the other of said arithmetic computing means, said predetermined program being such that consecutive applications of signals to the first arithmetic computing means are separated in time by at least the time it takes said first computing means to complete one of its computations.

5. Time shared digital computing apparatus wherein signals representing the results of distinct computations occur in the same time sequence as the data from which such results were derived regardless of the computation time for any of said computations comprising time shared digital computing apparatus comprising a memory device that cyclically presents in sequence sets of signals representing the variables in different problems to be computed, first and second computing means coupled to said memory device and adapted to begin assynchronously to perform different computations with said signals, said first computing means performing only long duration computations and said second computing means performing only short duration computations, the computation rate of said first computing means being greater than the cyclical rate at which said memory device cyclically presents the signals for any one of said problems, a time delay device connected to receive the output signals from said second computing means delaying its received signals by a time period equal to the difference between the times the two computing means take to perform their respective computations, and means for selecting in sequence different signals represented variables from each problem and applying according to a predetermined program those signals to one or the other of said computing means, said predetermined program being such that consecutive applications of signals to the first computing means are separated in time by at least the time it takes said first computing means to complete one of its computations.

6. Time shared digital computing apparatus wherein signals representing the results of distinct computations occur in the same time sequence as the data from which such results were derived regardless of the computation time for any of said computations comprising time shared digital computing apparatus comprising a memory device that cyclically presents in sequence sets of signals representing the variables in different problems to be computed, first and second arithmetic computing means coupled to said memory device to receive said signal sets, said computing means being adapted to perform different computations with different sets of said signals, said first arithmetic computing means performing only long duration computations and said second arithmetic computing means performing only short duration computations, said sequence of sets of signals being such that no short duration computations are started simultaneously with long duration computations, the computation rate of said first arithmetic computing means being greater than the cyclical rate at which said memory device cyclically presents the signals for any one of said problems, a time delay device connected to receive the output signals from said second arithmetic computing means delaying its received signals by a time period equal to the difference between the times the two arithmetic computing means takes to perform their respective computations, and means for selecting in sequence different signal represented variables from each problem and applying according to a predetermined program those signals to one or the other of said arithmetic computing means, said predetermined program being such that consecutive applications of signals to the first arithmetic computing means are separated in time by at least the time it takes said first computing means to complete one of its computations.

7. A time shared digital computer comprising a data storage device that cyclically provides in sequence different sets of signals for a plurality of problems, first and second computing means coupled to said storage device and respectively adapted to begin asynchronously to perform long and short duration computations with the signals from said signal sets, means connected to receive the output signals from said second computing means adapted to delay in time those signals by an amount equal to the difference between the computation times of said computing means, said first computing means having a computation time less than the time interval between successive computations for a given problem, and means coupled to said data storage device for selecting different combinaitons of signals according to a predetermined pattern, said pattern being so arranged that consecutive ordered computations by said first computating means are separated in time by the computation time of that means.

8. A time shared digital computer comprising a memory device that cyclically provides in sequence different sets of signals for a plurality of problems, first and second arithmetic computing means coupled to said memory device and respectively adapted to begin asynchronously to perform long and short duration computations with the signals from said signal sets, means connected to receive the output signals from said second arithmetic computing means adapted to delay in time those signals by an amount equal to the difference between the computation times of said arithmetic computing means, said first arithmetic computing means having a computation time less than the time interval between successive computations for a given problem, and means coupled to said memory device for selecting different combinations of signals according to a predetermined program, said program being so arranged that consecutive ordered computations by said first arithmetic computing means are separated in time by the computation time of that means.

9. Digital computing apparatus comprising first and second arithmetic computing means, said first arithmetic computing means having an input section for receiving signals representing data quantities and performing therewith only long duration computations, said second arithmetic computing means having an input section for receiving signals representing data quantities and performing therewith only short duration computations, said data signals being never applied simultaneously to both said arithmetic computing means, means connected to receive the output signals from said second arithmetic computing means adapted to delay in time those signals by an amount equal to the difference between the times that said first and second arithmetic computing means take to complete their respective computations, data storage means for storing the signals representing said data quantities and presenting those signals for computation at a cyclical rate that is less than the computation rate of the first arithmetic computing means, and means for selectively applying said data signals to one or the other of said arithmetic computing means according to a predetermined program that has ordered long duration computations spaced apart in time by at least the computation time of said first arithmetic computing means.

10. Digital computing apparatus comprising a data memory that cyclically provides signals representing data quantities for different problems, first and second computing means coupled to said memory and adapted to receive at dissimilar times the data signals and perform therewith computations, said first computing means performing only those computations which require substantial time to complete and said second computing means performing those computations which require less time to complete, said first computing means performing its computation at least as fast as said memory cyclically provides the signals necessary for the solution of the different problems, delay means connected to receive the output signals from said second computing means delaying in time those signals by a time period equal to the computation time of the first computing means, and signal selecting means coupled to said memory and adapted to apply according to a predetermined program particular data signals from the data memory to either said first or second computing means, there being a time interval at least equal to the computation time of the first computing means between the application of signals to said first computing means.

References Cited by the Examiner

UNITED STATES PATENTS 3,033,453 5/1962 Lode ______________ 235—153

MALCOLM A. MORRISON, *Primary Examiner.*

DARYL W. COOK, *Examiner.*

B. REIN, S. SIMON, *Assistant Examiners.*